(12) United States Patent
Cudahy (10) Patent No.: US 9,475,993 B1
(45) Date of Patent: *Oct. 25, 2016

(54) CONTINUOUS FLOW, HIGH CAPACITY SYSTEM FOR RAPIDLY CONVERTING HYDROCARBON CONTAINING POST-CONSUMER AND POST-INDUSTRIAL WASTE AND RENEWABLE FEEDSTOCKS INTO BIOFUEL

(71) Applicant: George Francis Cudahy, Anthony, NM (US)

(72) Inventor: George Francis Cudahy, Anthony, NM (US)

( * ) Notice: Subject to any disclaimer, the term of this patent is extended or adjusted under 35 U.S.C. 154(b) by 429 days.

This patent is subject to a terminal disclaimer.

(21) Appl. No.: 14/205,160

(22) Filed: Mar. 11, 2014

Related U.S. Application Data (60) Provisional application No. 61/804,175, filed on Mar. 21, 2013.

(51) Int. Cl.
| | |
|---|---|
| *C10G 1/06* | (2006.01) |
| *B01J 3/02* | (2006.01) |
| *B01J 19/00* | (2006.01) |
| *B01J 19/20* | (2006.01) |
| *C10G 1/00* | (2006.01) |

(52) U.S. Cl.
CPC ............ *C10G 1/008* (2013.01); *B01J 3/02* (2013.01); *B01J 19/004* (2013.01); *B01J 19/20* (2013.01); *C10G 1/06* (2013.01)

(58) Field of Classification Search
USPC .......................................... 422/187
See application file for complete search history.

(56) References Cited

U.S. PATENT DOCUMENTS

| | | | | | |
|---|---|---|---|---|---|
| 2,913,388 | A | * | 11/1959 | Howell | C01B 3/40 208/107 |
| 4,316,873 | A | * | 2/1982 | Koch | C10G 1/06 422/112 |
| 4,483,257 | A | * | 11/1984 | den Otter | C10G 1/08 110/218 |

* cited by examiner

*Primary Examiner* — Ellen McAvoy
*Assistant Examiner* — Chantel Graham
(74) *Attorney, Agent, or Firm* — Buskop Law Group, PC; Wendy Buskop (57) ABSTRACT

A continuous high capacity system for converting hydrocarbon containing post-consumer waste, post-industrial waste, renewable hydrocarbon feedstock into a biofuel, using a pug for blending less than 200 micron diameter particulate with a plasticizing agent; a sealing auger for forming an agglomerated material and sealing, a cutting device, a vacuum chamber to remove air from the cut material, an extruder forming an extrudate, a heating chamber or the heat exchanger to evolve at least one gas; a pressure sensor and temperature sensors in the heating chamber or the heat exchanger, a cooling chamber providing controlled pressure and controlled temperature cooling of the evolved gasses, wherein the cooling chamber liquefies sequentially at least 50 percent of the evolved gasses forming a liquid.

12 Claims, 3 Drawing Sheets

CONTINUOUS FLOW, HIGH CAPACITY SYSTEM FOR RAPIDLY CONVERTING HYDROCARBON CONTAINING POST-CONSUMER AND POST-INDUSTRIAL WASTE AND RENEWABLE FEEDSTOCKS INTO BIOFUEL

CROSS REFERENCE TO RELATED APPLICATION

The present application claims priority to and the benefit of U.S. Provisional Patent Application Ser. No. 61/804,175 filed on Mar. 21, 2013, entitled "CONTINUOUS FLOW, HIGH CAPACITY SYSTEM FOR RAPIDLY CONVERTING HYDROCARBON CONTAINING POST-CONSUMER AND POST-INDUSTRIAL WASTE AND RENEWABLE FEEDSTOCKS INTO BIOFUEL." This reference is hereby incorporated in its entirety.

FIELD

The present embodiments generally relate to a continuous flow, high capacity system for rapidly converting hydrocarbon containing post-consumer and post-industrial waste and renewable feedstocks into a biofuel.

BACKGROUND

A need exists to reduce hydrocarbon waste in landfills.

A further need exists to use hydrocarbon waste and renewable hydrocarbon feedstocks to create a fuel usable in transportation vehicles and for other energy requirements.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a continuous flow, high capacity system for rapidly converting hydrocarbon containing post-consumer and post-industrial waste and renewable feedstocks into a biofuel.

Implementation of this invention would transform biomass such as waste paper, cardboard, plastics and rubber; sewage treatment solid waste; animal manure; switch grass; and other solid hydrocarbons into liquid fuels.

The implementation of this invention nationwide would eliminate landfills and the landfill potential to leak the greenhouse gas methane into the atmosphere and potential to leak contaminants into the water table below the landfill site.

In addition, implementation of this invention nationwide could provide approximately five percent of the nation's total energy requirement from renewable energy sources. There is sufficient biomass waste generated on a daily basis to produce the cited amount of renewable energy. This would contribute to attaining the goal of energy independence and reduction of the potential for foreign energy suppliers to disrupt the economy of the United States.

Implementation of this invention would significantly reduce the amount of carbon dioxide emitted into the atmosphere.

Distribution of the implementation of this invention throughout the United States in order to process the biomass waste generated throughout the United States would greatly reduce the necessity of transporting liquid fuels from the liquid fuel sources to the refineries and from the refineries to the market. The liquid fuels produced with this invention would already be distributed, with the location of the fuel production closely matching the greatest market needs since the greatest market needs are where the greatest biomass waste is generated.

Since energy is required to raise the temperature of the biomass in order to transform the biomass into a gas in this process, any of the biomass gas not converted into a liquid in the biomass gas condensing process would be used to provide the energy input required in the process. Any biomass not converted to a gas in the solid to gas transforming part of this invention would be captured and recycled through the process.

The continuous high capacity system for converting hydrocarbon containing post-consumer waste, post-industrial waste, renewable hydrocarbon feedstock into a biofuel, uses a pug for blending less than 200 micron diameter particulate in the pug with a plasticizing agent; a sealing auger for forming an agglomerated material and sealing, a cutting device for shredding the agglomerated material; a vacuum chamber to remove air from the shredded agglomerated material; an extruder forming an extrudate; a heating chamber to evolve at least one gas; a pressure sensor and temperature sensors in the heating chamber, a cooling chamber providing controlled pressure and controlled temperature cooling of the at least one evolved gas, wherein the cooling chamber liquefies sequentially at least 50 percent of the at least one evolved gas forming a liquid, cooling chamber temperature sensors and pressure sensor, a pressure sealing controllable particle port with valve, liquid ports, a pressure regulator valve and monitors for temperature and pressure.

The heating chamber can be a reaction chamber that isolates the mixed material from ambient temperatures and pressures and undesired gasses. In embodiments, the heating chamber can be an insulated steel reaction vessel, adapted to support pressure ranges without deforming or exploding, notably of pressures up to 500 psi without deforming.

In other embodiments, a heat exchanger can be used instead of the heating chamber. The heat exchanger can have heat exchanger tubes surrounded by a heat exchanger duct. The heat exchanger duct can carry high temperature fluid over and around the exterior of the heat exchanger tubes, which can contain extrudate and then gas inside.

The cooling chamber can range in length in an embodiment to allow sufficient temperature variations along the cooling chamber for a given desired flow rate in order to separate the liquid fuels according to their particular condensing temperatures.

The cooling chamber can range in length based on the preset temperatures desired by the user. A longer cooling chamber can allow up to 100 tons per hour of hydrocarbon material to be processed, a shorter cooling chamber can only allow 1 ton of hydrocarbon material to be produced.

The current monitoring device for the motor can be an ammeter. The ammeter consists of a transformer around one of the extruder motor leads. The transformer then provides a signal to a meter or executive dashboard that presents the amperage of the motor.

To operate the system, the hydrocarbon material is first converted to a fine size.

The hydrocarbon material is then mixed with liquid hydrocarbon and/or water or any plasticizing agent to cause the waste material to behave in a plastic or quasiplastic manner. The hydrocarbon material and plasticizing agent combination must be able to be extruded using a sealing auger, an extrusion auger, or similar devices, and, at the same time be able to maintain an air seal across each auger.

In order to remove all or almost all air contained in the hydrocarbon material, the material is extruded into a vacuum chamber via a sealing auger where a high vacuum exists, which removes all or most of the air contained in the hydrocarbon particles while the material is in the vacuum chamber. The vacuum is maintained in the vacuum chamber via an external vacuum pump in conjunction with sealing the vacuum chamber from ambient air by the sealing auger and the extruding auger being filled or nearly filled with waste material, plus any shafts entering the vacuum chamber having appropriate seals. A shredding knife can be used on the hydrocarbon material as it exits the sealing auger to reduce the size of the agglomerated material in order to facilitate the removal of air from the hydrocarbon material by the vacuum present in the chamber.

After suitable time in the vacuum chamber to remove all, or almost all, of the entrained air in the shredded particles, the de-aerated particles are then extruded, using an extruding auger, into a heating chamber.

If air contained in the particles, prior to any potential air removal in the vacuum chamber, does not excessively interfere with the conversion process herein described if there is no air removal via a vacuum chamber, then the particles can be directly extruded into a heating chamber without first going through a vacuum chamber.

In order to raise the pressure of the plasticized material during the extrusion process a compression cap which reduces the area into which the particles are extruded prior to entering the heating chamber is usually added. This causes the plasticized material to be of a higher pressure than the heating chamber and/or heat exchanger pressure which facilitates the expanding and breaking up of the particles upon entering the heating chamber and/or heat exchangers.

Upon extrusion into the heating chamber, the heating chamber can directly heat the particles to change the hydrocarbons in the hydrocarbon materials into a gas or almost all into a gas. In another embodiment, a heat exchanger can indirectly heat the particles to change the hydrocarbons in the hydrocarbon materials into a gas or almost all into a gas. The particles can be heated directly by introduction of an oxidizing agent into the heating chamber thus oxidizing some of the carbon and/or hydrogen contained in the material to cause the particles to be rapidly heated, causing transformation of all or almost all of the particles into a gas. Other type heaters, such as electric heaters, may also be used to heat the particles. The particles can also be heated by injecting high temperature steam, or other high temperature products, into the heating chamber.

The hydrocarbon material can also be rapidly heated indirectly by extruding the material into or around a heat exchanger whereby external heat is applied to the heat exchanger which, in turn, applies the heat to the particles causing the rapid increase in the temperature of the material, thus changing all or almost all of the material to gasses.

The heating chamber in maintained at the desired temperature to which the hydrocarbon material is to be subjected so that the material is quickly raised to the desired temperature in the heating chamber.

Any liquids or solids which are not converted into a gaseous state in the heating chamber are collected at the bottom of the exit of the heating chamber or bottom of the entrance to the cooling chamber, or in between.

In order to change the gaseous hydrocarbon to a liquid state, or combination of liquid and gas, the gaseous hydrocarbon produced by the heating chamber is next introduced into a cooling chamber whereby the gaseous hydrocarbon is changed, via temperature regulation, or temperature and pressure regulation, to various liquids or gaseous biofuels and hydrocarbons.

Additional hydrogen can be introduced into the heating chamber to increase the amount of hydrogen contained in the fuel/hydrocarbon to be produced by injecting high hydrogen products, such as methane, liquid water, or steam at or above the heating chamber pressure in the amount required to produce the desired hydrocarbon products. If water, either gaseous or liquid, is used to supply additional hydrogen to the evolved gasses, the oxygen in the water will react with some of the carbon in the evolved gasses thus reducing the amount of carbon available in the evolved gasses to produce the desired product.

Water and/or high hydrogen to carbon ratio liquids can be mixed with the hydrocarbon material in the pug chamber to help change the hydrocarbon material to the desired plasticity for extruding and sealing while also enhancing the amount of hydrogen in the final product.

In order to facilitate the addition of high hydrogen gasses, such as natural gas, as the hydrocarbon material enters the heat exchangers, a gas manifold can be attached to the exit of the extrusion auger and entrance to the heat exchanges such that the high hydrogen gas and the extruded hydrocarbon material enter the heat exchangers together and thus react together as they proceed along the heat exchangers while increasing in temperature in the heat exchangers.

The heating chamber and cooling chamber can operate at pressures other than the ambient pressure external to the heating and cooling chambers since the extruding auger used to extrude the hydrocarbon material into the heating chamber is capable of producing extruder exhaust pressures either below the ambient pressure or pressures well above the ambient pressure, whatever pressure in the heating chamber is desired.

Pressures in the heating chamber and the cooling chamber can be controlled by regulating the release of the remaining gasses in the cooling chamber; or condensing all or almost all of the gasses entering the cooling chamber into liquid.

Figure 1:
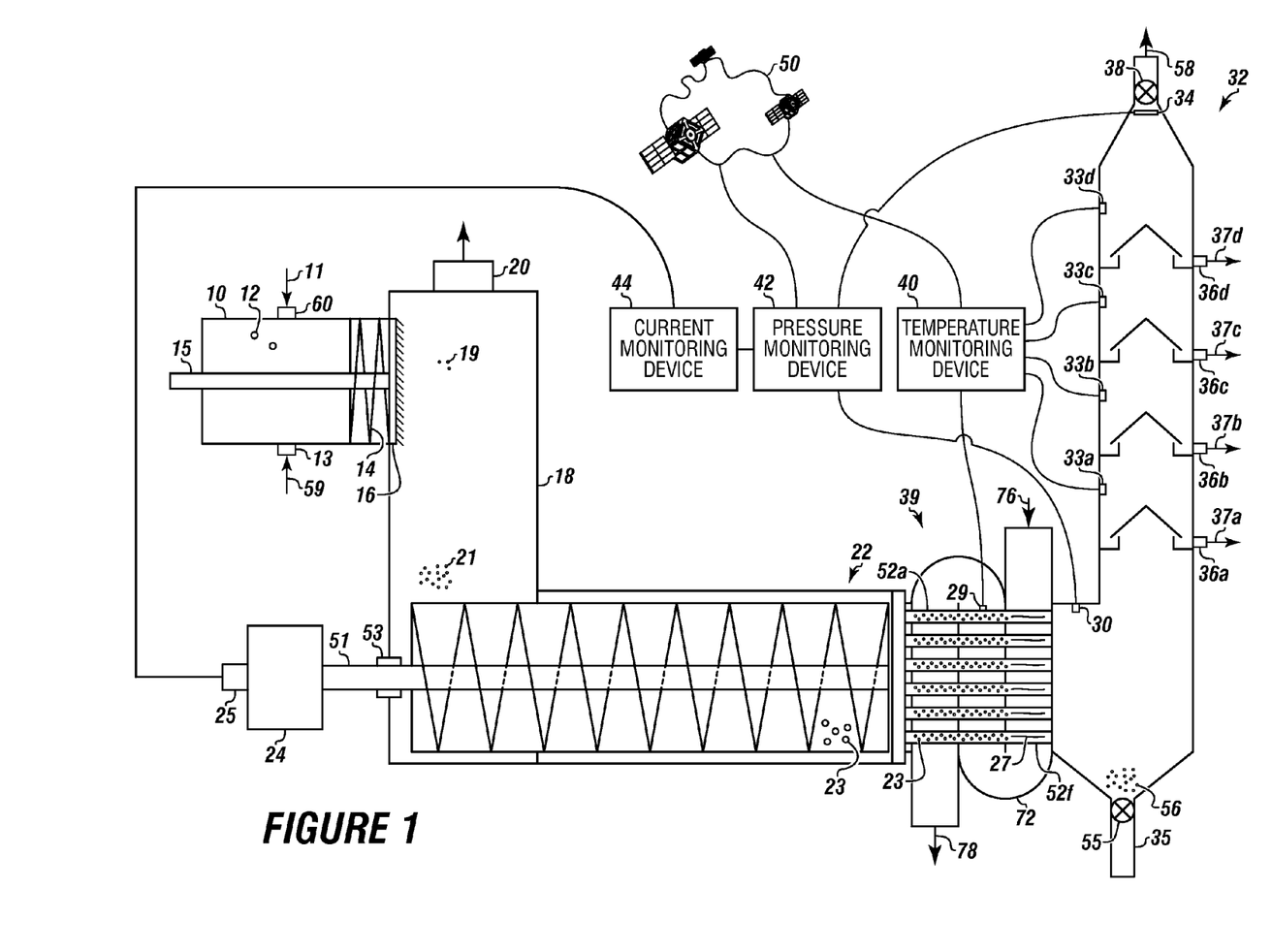
FIG. 1 is an overall diagram of the system with a heat exchanger to produce a biofuel from post-consumer and post-industrial hydrocarbon waste and renewable hydrogen feedstock.

Turning now to the Figures, FIG. 1 is a diagram of the continuous high capacity system with a heat exchanger for converting hydrocarbon containing post-consumer waste, post-industrial waste, renewable feedstocks, or combinations thereof into a biofuel.

A pug 10 can be used to receive waste 11 through a waste port 60, such as post-consumer hydrocarbon containing waste, post-industrial hydrocarbon containing waste, renewable hydrocarbon feedstocks, or combinations thereof.

The pug 10 can be a chamber for blending the finely divided hydrocarbon based material with a plasticizing agent. The finely divided hydrocarbon based material can be introduced at the opposite end from a sealing auger. The plasticizing agent 59 is introduced at the same end as the finely divided hydrocarbon based material. The pug can consist of a rotating shaft containing knives, that mix the finely divided hydrocarbon based material with the plasticizing agent to form a plasticized material and transfers the plasticized material down the chamber to the sealing auger.

In an embodiment, a plasticizing agent 59 can be inserted through a plasticizing agent input port 13 which is used to plasticize the hydrocarbon material 12 in the pug.

The sealing auger 14 can be located at the end of the pug chamber and at the entrance of a vacuum chamber, which can be driven by a sealing auger drive shaft 15.

The sealing auger can be an auger which when filled with the plasticized material forms a seal between the pug and the vacuum chamber and transfers the plasticized material to the vacuum chamber. The vacuum chamber pressure can be less than 0.5 inches of mercury absolute.

A cutting device 16 can be used to shred the plasticized material 12 into shredded particles 19 to facilitate removal of air from the plasticized material in the vacuum chamber. In one or more embodiments, the cutting device can be a shredder, which can have from 16 blades to 24 blades.

In one or more embodiments, the cutting device can contain a plurality of radial knives connected to the sealing auger drive shaft to cut the material exiting from the sealing auger. In an embodiment, the plurality can have from 4 knives to 50 knives used on the cutting device.

A vacuum chamber 18 can receive the shredded particles 19 of the plasticized material 12 while a vacuum pump 20 connected to the vacuum chamber 18 removes air from the shredded particles 19, forming de-aerated particles 21.

The vacuum pump 20 can be a SIHI liquid ring vacuum pump that can pull gas from the mixed material in the vacuum chamber by creating a vacuum in the vacuum chamber of less than 0.5 inches of mercury absolute.

An extruder 22 which can be a single or multi-screw extruder can be used to receive the de-aerated particles 21.

The extruder 22 can be used to agglomerate and pressurize the de-aerated particles 21 to a pressure from ambient pressure to 500 psi thus forming an air-free extrudate 23. When the extruder is sufficiently filled with the plasticized material it and the plasticized material form a gas tight seal between the vacuum chamber and the heating chamber.

The extruder 22 can have an extruder shaft 51 and an extruder shaft seal 53. The extruder 22 can be run by an extruder motor 24 that has an extruder motor current sensor 25 for controlling the extruder motor 24. The extruder motor current sensor 25 can be used to monitor both: plasticity of the extrudate in the extruder, and pressure on the extrudate in the extruder.

In one or more embodiments, the heat exchanger 39 can receive the air-free extrudate 23. The heat exchanger can rapidly heat the hydrocarbon material to a selected temperature from about 500 degrees Fahrenheit to about 1200 degrees Fahrenheit in order to form hydrocarbon gasses 27.

In other embodiments, the heat exchanger can be replaced with a heating chamber.

External heat can be applied to the heat exchanger 39 and heat the exchanger tubes 52a, 52b, 52c, and 52d by a heat exchanger duct 72 surrounding the heat exchanger tubes, the duct supplying high temperature gasses or liquids to the exterior of the heat exchanger tubes. The entrance of the heat exchanger duct for the high temperature gasses or liquids is a first duct port 76 and the second duct port 78 exhausts the high temperature gasses or fluids from the heat exchanger duct 72.

At least one pressure sensor 30 can be used for detecting pressure in the heating area enabling the pressure dependent process to be controlled.

At least one temperature sensor 29 can be used for detecting temperature in the heating area enabling the temperature dependent process to be controlled.

A cooling chamber 32 can receive the gasses 27 and can provide controlled pressure release and controlled temperature cooling on the gasses 27 which have been evolved.

The cooling chamber can liquefy sequentially at least 50 percent of the gasses 27 which have been evolved, forming separated liquids 37a, 37b, 37c, and 37d that can be emitted through liquid removal ports 36a, 36b, 36c, and 36d that can be positioned sequentially in the cooling chamber.

A plurality of temperature sensors 33a, 33b, 33c, and 33d can be disposed in the cooling chamber 32 with at least one sensor adjacent to the liquid removal ports 36a, 36b, 36c, and 36d.

Additionally, a cooling chamber pressure sensor 34 can be in the cooling chamber 32 which can be used with a control device to prevent pressures from exceeding or dropping below preset limits.

A pressure sealing controllable particle port 35 with valve 55 can be located between the exit of the heat exchanger 39 and the entrance to the cooling chamber 32 and used for removing particles and liquids 56 from the process that are not converted to one of the gasses created during the heating process in the heating chamber.

In one or more embodiments, air-free extrudate 23 can be a continuous plasticized mass.

In one or more embodiments, the liquid removal ports 36a, 36b, 36c, and 36d can each have a preset temperature.

Additionally, a pressure regulator valve 38 can be used for controlling pressure in the cooling chamber 32 and for removing unconverted gas 58 as a fuel which can be used as a fuel source for heat exchanger 39, a heating chamber, or other uses.

In one or more embodiments, a temperature monitoring device 40 can be used for monitoring the plurality of temperature sensors 33a, 33b, 33, and 33d. In an embodiment, the temperature monitoring device 40 can be a laptop, a computer, or another monitoring system. In embodiments, the temperature monitoring device 40 can be connected to a network 50, which can allow remote monitoring of the process.

In one or more embodiments, a pressure monitoring device 42 can be used for monitoring the pressure sensor 30, the cooling chamber pressure sensor 34, and combinations thereof. In embodiments, the pressure monitoring device 42 can communicate with the network 50 for monitoring from a remote location, and the pressure monitoring device can be a computer, a laptop, a cellular or mobile phone, a tablet, a meter, or similar device.

In embodiments, the network can be a cellular network, the internet, a local area network, a wide area network, separate meters, a similar network, or combinations thereof.

In embodiments, a current monitoring device 44 can be used for monitoring the extruder motor 24. The current monitoring device 44 can communicate using the network 50 or a separate meter.

In embodiments the system can continuously produce biofuel from up to 100 tons an hour of the hydrocarbon containing material.

The hydrocarbon containing post-consumer and post-industrial waste and renewable feedstocks can be paper, cardboard, wood, rubber, plastics, manure, sewage solids, switch grass, garbage, grass, and other hydrocarbon and carbon containing materials.

In embodiments, the finely divided hydrocarbon materials introduced into the pug chamber should have diameters of less than 200 microns in order to facilitate the rapid conversion of the solid hydrocarbon material into gasses in the heating chamber.

In embodiments, the vacuum pump removes over 95 percent of the air from the particles of plasticized material in the vacuum chamber.

In embodiments, wherein the plasticizing agent is used, the plasticizing agent can be glycerol, oil, oil based liquid, water, water based liquid, detergents, or combinations thereof.

Figure 2:
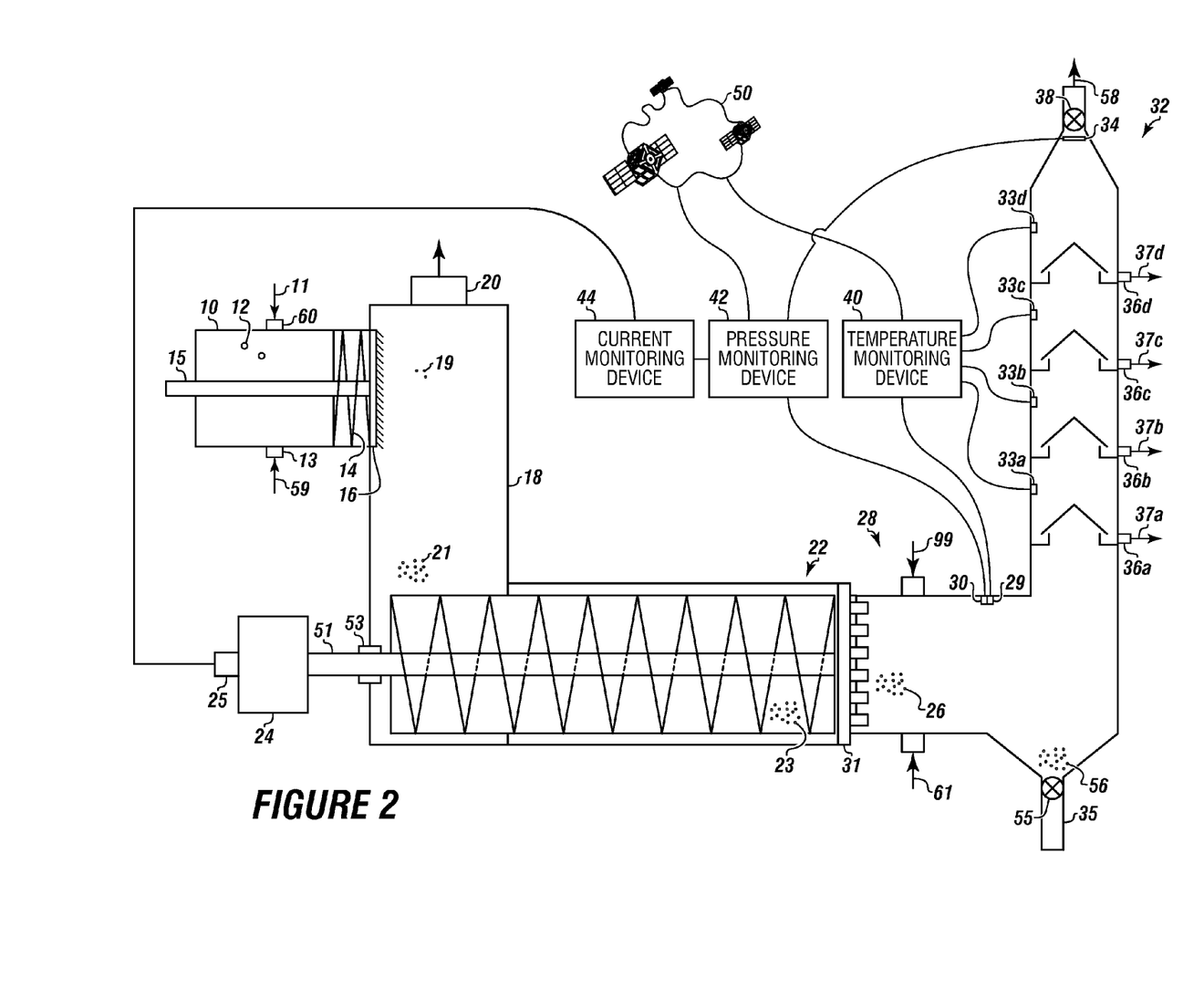
FIG. 2 is an overall diagram of the system to produce a biofuel from post-consumer and post-industrial hydrocarbon waste and renewable hydrogen feedstock without a heat exchanger.

FIG. 2 is an overall diagram of the system without a heat exchanger to produce a biofuel from post-consumer and post-industrial hydrocarbon waste and renewable hydrocarbon feedstock.

The embodiment illustrated in FIG. 2 is similar to the embodiment illustrated in FIG. 1. Therefore, in the interest of brevity, those elements described in FIG. 1 will not be described again with reference to FIG. 2.

In the system, the extrudate 23 or shredded extrudate 26 can be directly and rapidly heated to the required process temperature by injecting high temperature steam or other high temperature fluids 61 directly into the heating chamber 28. The injection of the high temperature steam directly into the heating chamber 28 can cause some of the carbon in the hydrocarbon waste or renewable hydrocarbon to be oxidized by the oxygen in the steam thugs reducing the amount of carbon available to be transformed into biofuel but providing additional hydrogen into the process.

In the heating chamber 28 the extrudate 23 and/or the shredded extrudate 26 can be heated directly and rapidly by injecting into the heating chamber an oxidizing agent 61 which can react with some of the carbon and/or hydrogen in the extrudate 23, shredded extrudate 26, or combinations thereof, causing rapid heating of the extrudate and/or shredded extrudate. This reaction with some of the carbon and/or hydrogen reduces the amount of carbon and/or hydrogen available to be converted to biofuel.

In the system, the extrudate 23 and/or shredded extrudate 26 can be rapidly heated by placing a heater inside the heating chamber 28. The heater can be an electric heater, a gas heater, or some other type of similar heater.

In the system, a high hydrogen content gas or liquid can be injected directly into the heating chamber 28 in order to increase the hydrogen content of the extrudate 23 and/or shredded extrudate 26 to obtain the necessary carbon and hydrogen mix for the biofuel desired.

In this Figure, a shredder 31 can be connected between the extruder 22 and the heating chamber 28 or between the extruder 22 and the heat exchanger 39 for shredding the extrudate 23.

Figure 3:
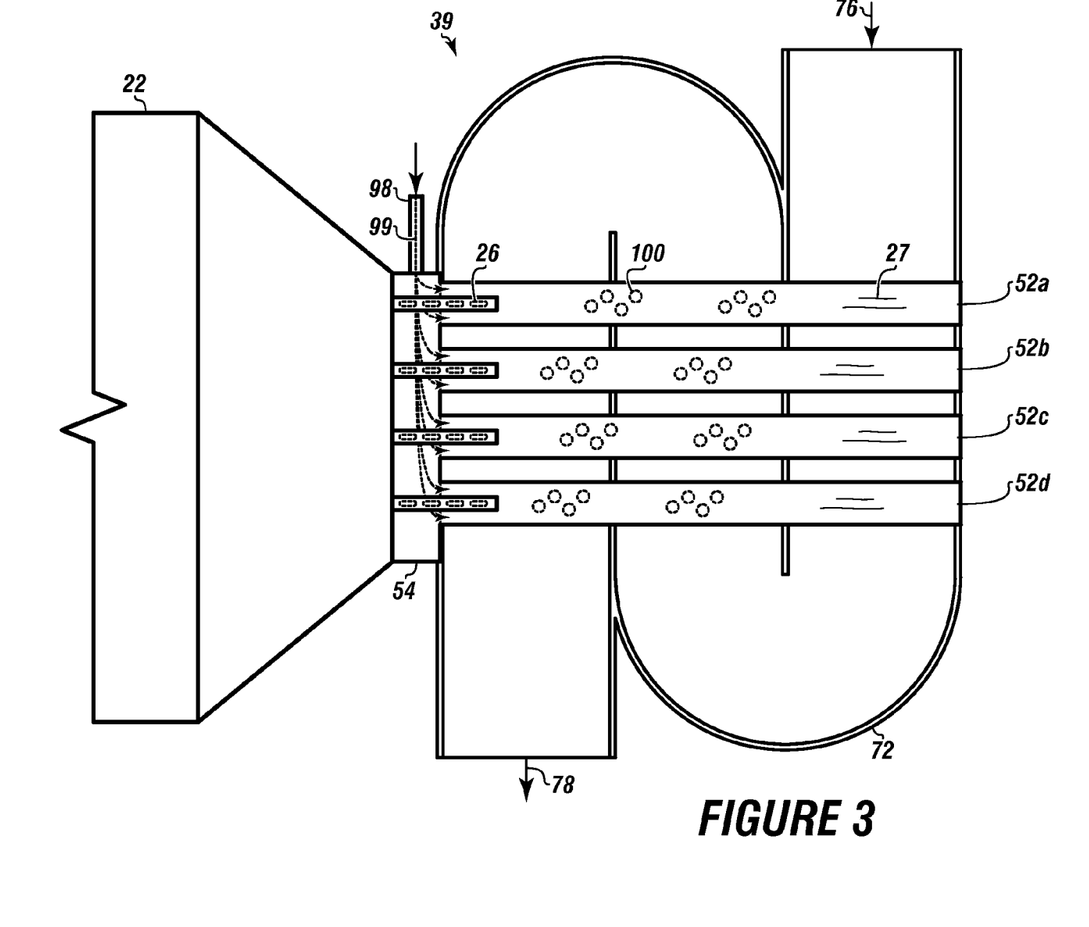
FIG. 3 depicts a manifold for injecting high hydrogen content gas or liquid into the process according to one or more embodiments and contains additional detail of the heat exchanger of FIG. 1.

FIG. 3 depicts a manifold for injecting high hydrogen content gas or liquid into the process and contains greater detail of the heat exchanger of FIG. 1.

The heat exchanger 39 can be formed from a plurality of heat exchanger tubes 52a, 52b, 52c, and 52d.

The extrudate 23 and/or shredded extrudate 26 can flow from the extruder 22 though the heat exchanger tubers 52a-52d forming gasses 27.

In embodiments, the heat exchanger 39 can be a thin walled tube style heat exchanger allowing for rapid transfer of external heat to the material in the heating chamber.

In one or more embodiments, manifold 54 can be positioned between the extruder 22 and the heat exchanger 39 or in other embodiments, the heating chamber 28, for allowing high hydrogen content gas or liquid 99 to flow into the extrudate 23 as the extrudate enters the heating chamber or the heat exchanger tubes thus forming a gas extrudate mix 100.

In one or more embodiments, the manifold can be a natural gas manifold.

External heat can be applied to the heat exchanger 39 and heat the exchanger tubes 52a, 52b, 52c, and 52d by a heat exchanger duct 72 surrounding the heat exchanger tubes, the duct supplying high temperature gasses or liquids to the exterior of the heat exchanger tubes. The entrance of the heat exchanger duct for the high temperature gasses or liquids is a first duct port 76 and the second duct port 78 exhausts the high temperature gasses or fluids from the heat exchanger duct 72.

The heat exchanger 39 or in other embodiments, the heating chamber 28, can have a gas or liquid port 98 for flowing high hydrogen content gas or liquid 99 through the gas or liquid port 98 and into the manifold 54.

In one or more embodiments, usable extruders can be a singled shaft or multiple shaft extruder. The extruder motor current sensor can be an ammeter.

Below is an Example of the System:

Waste paper and cardboard at the rate of 25 tons per hour, reduced in size to 50 micron minus, is transported to a J C Steele 75AD combination pug sealer and extruder into the pug sealer mixer. The fine waste paper and cardboard are transported from a storage silo, the feed from the storage silo regulated at a constant rate via two feed screws installed at the bottom of the silo, via an enclosed screw conveyor to the pug mixer. A plasticizing agent, in this case glycerol obtained as a byproduct from conversion of waste cooking oil to bio-diesel, is added at the input of the pug mixer at a rate sufficient to control the energy input to the extrusion process. In the case of glycerol, the initial rate is 60 pounds per minute which is seven percent of the fine paper-cardboard weight rate. The rate of the glycerol addition is subsequently adjusted to control the amperage of the extruder motor. The combination paper-cardboard and glycerol is mixed to a uniform consistency in the pug mixer and is transported towards the pug sealer and vacuum chamber by the mixing knives, the angle of the knives being set in such a manner to control the rate of transport along the length of the pug mixer. At the entrance to the pug sealer the combination paper-cardboard and glycerol is now a plasticized extrudate.

The extrudate next enters the pug sealer, which is on the same shaft as the pug knives, the pug sealer agglomerating the extrudate and providing a seal between ambient pressure in the pug and the vacuum in the vacuum chamber, the vacuum chamber being an integral part of the J C Steele combination pug sealer and extruder machine. Upon exiting the pug sealer the extrudate passes through shredding knives which are also on the same shaft as the pug knives. The shredded extrudate drops from the shredding knives to the bottom of the vacuum chamber into the rearward extension of the extruder flights which extend into the vacuum chamber. These flights pick up the shredded extrudate and transport the extrudate into the enclosed portion of the extruder. The shredded extrudate is subjected to a vacuum of 25 inches of mercury below ambient when the process is located at 3,750 feet above sea level. The shredded extrudate is subjected to this vacuum for an approximate average twelve seconds prior to being agglomerated in the enclosed portion of the extruder. The vacuum in the vacuum chamber is provided by a SIHI LPH 55312 liquid ring vacuum pump driven by a 15 horse power, four pole, 1800 RPM motor, the working liquid being transformer oil. The transformer oil is cooled, while in operation, by water in a oil/water heat exchanger, the water subsequently being cooled in an water/air radiator. The SIHI liquid ring vacuum pump maintains a vacuum of 95% below ambient pressure. The shredded extrudate subjected to this vacuum has approximately 95% of the air contained in the extrudate upon entering the vacuum chamber removed prior to entering the enclosed portion of the extruder.

Upon the extrudate entering the enclosed portion of the extruder, the extrudate is once again agglomerated and pressurized in the extruder forming a seal between the vacuum chamber and the extruder exit. The desired pressure is controlled by the amount of plasticizing agent, in this case glycerol, added to the paper-cardboard fines in the pug mixer, the amount of energy exerted upon the extrudate by the extruder, and the size of the cap attached to the extruder exit. The exit cap is set at six inches in inside diameter. The extruder is powered by a 200 horse power, 8 pole, 900 rpm, Baldor totally enclosed, fan cooled, 480 volt, three phase motor with roller bearings on its output shaft. The motor being connected to the extruder shaft via speed reducing belts, belt sheaves, and an air operated clutch mechanism, the input sheave and the clutch being an integral part of the J C Steele 75AD. The amperage input to the motor is monitored by a Yokogawa 800 Plus Universal Digital Meter ammeter which, besides an amperage readout, has two amperage dependent relays. In this case, the extruded extrudate output being subject to a desired pressure of only about six PSI Gauge, the desired current is approximately 140 amperes. The first amperage relay is set at 170 amperes and is used to turn on a warning light to warn the operator of excessive current to the extruder motor. The second amperage relay is set to 200 amperes and is used to automatically disengage the extruder motor input clutch in order to prevent damage to the extruder. The extruder-pug operator monitors the amperage as shown on the Yokogawa ammeter and manually adjusts the amount of glycerol added to the paper-cardboard fines in the pug mixer to obtain the desired amperage input to the extruder motor and thus the pressure of the extrudate in the extruder. To lower the amperage additional glycerol is added and to raise the amperage the rate of glycerol is reduced.

Upon exiting the extruder cap the extrudate enters a heat exchanger where the temperature of the extrudate is rapidly heated to 800 degrees Fahrenheit in order to change the extrudate into a gas. The heat exchanger consists of 20 round Type 310 stainless steel tubes which have an interior diameter of two inches and a wall thickness of 0.050 inches. The tubes are six feet long. The tubes are arranged with four tubes in each layer arranged in the same plane horizontally with five layers. The tubes in each horizontal layer are separated by one inch and the layers are separated by two inches. The tube combination is surrounded by a heating manifold, the manifold being one inch above and one inch below the heat exchanger tube combination with the entrance end of the tubes and the exit end of the tubes isolated from the heating manifold. The heating manifold has an internal entrance of 1.875 square feet, 18 inches wide and 20.5 inches high, and the entrance covering all 20 tubes for the final 18 inches of the heat exchanger tubes. The manifold goes across the 20 tubes and then makes a 180 degree turn back towards the entrance now covering the third 18 inches of the heat exchanger tubes, the first 18 inches of the heat exchanger tubes being at the entrance of the tubes. Upon crossing all of the third 18 inches of the tubes the heating manifold makes another 180 degree turn away from the heating chamber entrance and crosses the second 18 inches of the heat exchanger tubes. Upon crossing all of the second 18 inches of the heat exchanger tubes the heating manifold makes another, and final, 180 degree turn back in the direction of the heating manifold entrance and thence covering the first 18 inches of the heat exchanger tubes, finally exhausting to the atmosphere.

The heating manifold is heated internally by a group of six burners located so as to exhaust into the heating manifold entrance, each capable of providing up to seven million BTUs of energy output per hour to the entrance of the heating manifold. The burners are the pressure air type burner, with the air requirement to each burner of 1.3 pounds air per second at an input pressure of 20 inches of water static pressure. The air is provided by a direct drive centrifugal blower driven by a two pole, 3600 RPM, three phase, totally enclosed fan cooled, 480 volt, 50 horse power motor capable of providing 7,000 cubic feet air per minute at 20 inches of water static pressure. The energy input to the burners is initially provided by natural gas at 683 cubic feet per minute at a sea level standard 1025 BTU per cubic foot. Once the process reaches a steady state operation the non-liquefied gases exhausted from the top of cooling tower are sufficient to provide the necessary energy to power the manifold heating burners.

Once the mostly gasified extrudate exits the heat exchanger tubes the gas and any extrudate which has not been transformed into a gas, enters a chamber ten feet long and six feet in diameter where any extrudate not transformed into a gas falls to the bottom of this chamber and is removed from the chamber by a rotating sealing lock which is able to remove solids and liquids from this chamber without allowing low pressure gases to escape. This chamber is made of 0.10 thick mild steel and is insulated to prevent the gases generated in the heat exchanger tubes from decreasing in temperature and thus condensing some of those gases. This chamber contains four K Type thermocouples arranged near the exit of the heat exchanger tubes at an angle of 90 degrees around the central axis of the heat exchanger tubes at a radius of six inches and one other K Type thermocouple at the central axis of the heat exchanger tubes, also near the exit of the heat exchanger tubes. These thermocouples are connected to digital temperature controllers in order for the heat exchanger monitor to view the temperature of the gases and manually control the heat input to the heating manifold surrounding the heat exchanger tubes. This chamber also contains a pressure tap connected to a pressure gauge in order for the operator to be able to monitor the pressure at the exit of the heat exchanger tubes.

The heat exchanger generated gases next enter the cooling tower where the gases are condensed into liquids. This tower consists of a vertical 10 foot diameter cylinder 50 feet high made of 0.125 inch thick mild steel surrounded by a 0.10 inch thick mild steel cylinder of 10 feet six inch diameter which transports the cooling water around the condensing tower. While the intent of this invention is to transform solid hydrocarbon material into liquid fuels and not necessarily to separate those liquids into liquids of different boiling temperatures, the introduction of trays at different heights and temperatures is included in this manifestation since it facilitates the condensation of the gases and is also an economical addition to the manifestation in order to accomplish some degree of that separation. The tower includes, in this manifestation, nine circumferential trays with pyramidal caps above each one, a gas lock at the bottom of the tower, an automatic pressure regulator at the top and two emergency pressure blow-off valves at the top. The tower has a rotating gas lock at the bottom to carry away any condensed liquids which accumulate at the bottom without releasing any gases contained in the tower. The circumferential trays have an outer diameter connected and sealed to the inner diameter of the condensing tower and an inner diameter of five feet with a lip on the inner diameter of four inches above the tray bottom. The pyramidal caps have an outer diameter of six feet and which outer diameter extends 1.50 inches below the top of the tray outer diameter lip top. The trays are five feet apart in elevation starting at five feet above the bottom of the condensing tower. Each tray has an outlet located two inches above the bottom of the tray, said outlet is provided with a valve which allows liquids, but not gases to exit through the condensing tower and the outer cooling water jacket. The automatic pressure regulator at the top of the tower is six inches in diameter with a conical vertically moving plug weighing 57 pounds in order to regulate the pressure at the top of the tower at two PSI Gauge. The outlet of this regulator is an eight inch diameter pipe with a wall thickness of 0.125 inches, the pipe to regulator to condensing tower forming a sealed connection so as not to allow any gases to escape to the surrounding atmosphere. The pipe is reduced in size to six inches diameter and is extended down to the heating manifold burners in order to transport the non-condensed gases to the heating manifold burners for use to supply the energy required by these burners. Also located at the top of the condensing tower are two emergency pressure relief valves, each valve consisting of a 12 inch diameter flat hole in the top of the condensing tower sealed with a 13 Inch diameter gasketed plate using 0.25 inch thick buna-n rubber as the gasket material. Each of these plates is weighted with 450 pounds of lead and connected on one side with a two foot arm which is hinged at its outer most extremity to allow the sealing plate to rise up and release any pressure within the condensing tower which exceeds four PSI Gauge.

In order to cool the condensing tower, the tower is surrounded with the water cylinder. Water is pumped into the space between the condensing tower and the cooling water cylinder tangentially at the top of the condensing tower/cooling water cylinder at a rate of 1,000 gallons per minute at a velocity of 15 feet per second through a round nozzle of five inches in diameter. This provides for a spiraling flow of water around the condensing tower gradually descending down the condensing tower, allowing a three minute residence of the cooling water from the time of entrance until the time of exit. The rate of exit from the cooling cylinder is manually regulated by adjusting a valve on the exit water point by watching the pressure on the output of the cooling water pump and controlling it to a pressure of 23 PSI Gauge. The pump to pump the cooling water is a Gould Centrifugal Water Pump-DUGL 15 F-30 powered by a 30 horse power, 480 volt, three phase, two pole, 3600 rpm motor located in the same horizontal plane as the base of the condensing tower. After the exit of the cooling water from the cooling water cylinder the water is transported to a traditional cooling tower in order to cool the water to a maximum of 100 degrees Fahrenheit prior to being recycled back to the cooling cylinder pump.

Thermocouples of the J Type are located at each of the trays in the condensing tower in order to monitor the temperatures of the liquids at each of the points in the condensing tower. J Type thermocouples are also located at the exit of the condensing tower and the cooling water entrance to and exit from the cooling cylinder. These thermocouples are connected to digital temperature controllers in order for the operator to monitor the condensing process.

While these embodiments have been described with emphasis on the embodiments, it should be understood that within the scope of the appended claims, the embodiments might be practiced other than as specifically described herein.

What is claimed is:

1. A continuous high capacity system for converting hydrocarbon containing post-consumer waste, post-industrial waste, renewable hydrocarbon feedstock or combinations thereof, into a biofuel, comprising:
    a. a pug for receiving less than 200 micron diameter particulate post-consumer hydrocarbon containing waste, post-industrial hydrocarbon containing waste, renewable hydrocarbon feedstock, or combinations thereof, and blending the less than 200 micron diameter particulate with a plasticizing agent to form a plasticized material;
    b. a sealing auger in communication with the pug for receiving and agglomerating the plasticized material, wherein the agglomerated material in combination with the sealing auger forms a seal with the pug;
    c. a cutting device shreds the plasticized and agglomerated material into shredded particles;
    d. a vacuum chamber for receiving the shredded particles, wherein a vacuum pump connected to the vacuum chamber removes air from the shredded particles, forming de-aerated particles, and wherein the vacuum chamber is sealed from the pug and ambient air using the sealing auger;
    e. an extruder for receiving the de-aerated particles and pressurizing the de-aerated particles to a pressure from below ambient pressure to 500 psi, agglomerating the plasticized material into an extrudate, which can be a continuous plasticized mass, wherein the extrudate in combination with the extruder forms a seal from the vacuum chamber;
    f. a heating chamber for receiving the extrudate and rapidly heating the extrudate to a temperature from 500 degrees Fahrenheit to 1200 degrees Fahrenheit to evolving at least one gas;
    g. a heating chamber pressure sensor for detecting pressure in the heating chamber;
    h. at least one heating chamber temperature sensor for detecting temperature in the heating chamber;
    i. a cooling chamber providing controlled pressure and controlled temperature cooling of the at least one gas which has been evolved, wherein the cooling chamber liquefies sequentially at least 50 percent of the at least one gas which has been evolved, forming at least one separated liquid;
    j. at least one temperature sensor in the cooling chamber;
    k. a pressure sensor in the cooling chamber;
    l. a pressure sealing controllable particle port with a valve for removing particles and liquids from the cooling chamber that are not converted to gas in the heating chamber;
    m. at least one liquid removal port, wherein each liquid removal port removes a liquid at a preset temperature and pressure as the gas is cooled;

n. a pressure regulator valve for controlling pressure in the cooling chamber and for removing gas from the cooling chamber;

o. a temperature monitoring device for monitoring at least one cooling chamber temperature sensor and at least one heating chamber temperature sensor; and p. a pressure monitoring device for monitoring the heating chamber pressure sensor and the cooling chamber pressure sensor.

2. The system of claim 1, further comprising a plasticizing agent inlet port for injecting a plasticizing agent.

3. The system of claim 1, wherein the temperature monitoring device and the pressure monitoring device communicate to a network.

4. The system of claim 1, further comprising: transporting hydrocarbon containing post-consumer waste, post-industrial waste, renewable hydrocarbon feedstock or combination thereof, through a heat exchanger which consists of a plurality of heat exchanger tubes to supply external heat to the extrudate.

5. The system of claim 4, wherein the heat exchanger is a thin walled tube style heat exchanger allowing for rapid transfer of external heat to the extrudate in the heating chamber.

6. The system of claim 4, wherein the heat exchanger has a heat duct that flows hot gasses or liquids over and around the heat exchanger tubes to supply external heat to the heat exchanger tubes and the extrudate and evolved gasses contained on an interior of the heat exchanger tubes.

7. The system of claim 4, further comprising a natural gas manifold positioned between the extruder and the heating chamber or the extruder and the heat exchanger allowing natural gas to flow into the extrudate as the extrudate flows in the heating chamber or the heat exchanger.

8. The system of claim 1, further comprising a shredder connected between the extruder and the heating chamber or heat exchanger for shredding the extrudate into an air-free shredded extrudate.

9. The system of claim 1, wherein the pressure regulator valve for controlling pressure in the cooling chamber can remove gas and recycle the gas as a fuel for the heating chamber, the heat exchanger, and other uses.

10. The system of claim 1, wherein the extruder has an extruder motor and an extruder motor current sensor for monitoring:

a. plasticity of the air-free plasticized materials in the extruder; and b. pressure on the air-free plasticized materials in the extruder.

11. The system of claim 10, further comprising a current monitoring device for monitoring the extruder motor current sensor.

12. The system of claim 11, wherein the current monitoring device communicates to a network.

* * * * *